(12) United States Patent
Fratti

(10) Patent No.: US 8,250,392 B2
(45) Date of Patent: Aug. 21, 2012

(54) FAST TURN-ON/OFF FOR ENERGY EFFICIENT ETHERNET

(75) Inventor: Roger Fratti, Mohnton, PA (US)

(73) Assignee: LSI Corporation, Milpitas, CA (US)

( * ) Notice: Subject to any disclaimer, the term of this patent is extended or adjusted under 35 U.S.C. 154(b) by 426 days.

(21) Appl. No.: 12/622,592

(22) Filed: Nov. 20, 2009

(65) Prior Publication Data

US 2011/0126028 A1    May 26, 2011

(51) Int. Cl.
*G06F 1/00* (2006.01)
(52) U.S. Cl. ............... 713/320; 713/323; 713/324
(58) Field of Classification Search .............. 713/320, 713/323, 324
See application file for complete search history.

(56) References Cited

U.S. PATENT DOCUMENTS

| | | | |
|---|---|---|---|
| 4,093,847 A * | 6/1978 | Walker et al. | 219/501 |
| 5,555,438 A * | 9/1996 | Blech et al. | 710/30 |
| 6,570,408 B2 * | 5/2003 | Nowka | 326/95 |
| 7,746,153 B1 * | 6/2010 | Megaw | 327/390 |
| 2006/0265624 A1 * | 11/2006 | Moshayedi et al. | 714/2 |
| 2008/0225841 A1 | 9/2008 | Conway et al. | |
| 2008/0294919 A1 | 11/2008 | Lida et al. | |
| 2009/0088908 A1 | 4/2009 | Karam | |
| 2009/0119524 A1 | 5/2009 | Hays | |
| 2009/0204827 A1 | 8/2009 | Diab et al. | |
| 2010/0123412 A1 * | 5/2010 | Kawauchi et al. | 315/291 |

* cited by examiner

*Primary Examiner* — Jorge L Ortiz Criado
*Assistant Examiner* — Scott E Snyder

(57) ABSTRACT

In described embodiments, turn-on time for active portions of an Energy Efficient Ethernet (EEE) device is improved by storing energy in a corresponding capacitor bank through a bidirectional device from a certain node in the device during an active state, continuing to store the energy when the device enters a Low Power Idle (LPI) state, and then allowing the energy to return to the node through the bidirectional device when the device returns to an active state. During active mode, the bidirectional device controls the capacitor bank so as to charge relatively slowly to store energy, and when the device transitions to LPI, the charge is maintained in the capacitor bank. When the device returns to the active state, the bidirectional device allows the capacitor bank to discharge relatively rapidly to the node, thereby improving the turn-on time of the circuit elements coupled to the node.

16 Claims, 4 Drawing Sheets

FAST TURN-ON/OFF FOR ENERGY EFFICIENT ETHERNET

BACKGROUND OF THE INVENTION

1. Field of the Invention

The present invention relates to circuits for fast turn-on/off in energy efficient Ethernet systems.

2. Description of the Related Art

Energy Efficient Ethernet (EEE) is a technique that causes transition of an Ethernet device between Active and Low Power Idle (LPI) states. The LPI state is a low power consumption state, and a device transitions to the LPI state based upon network demand. For EEE, the Ethernet network transmits data as fast as possible in the active state, then transitions to LPI to save energy. EEE is presently under study for standardization for Ethernet networks by the Institute of Electrical and Electronic Engineers (IEEE) committee 802.3az. The standardization process is specified for 100BASE-TX (Full Duplex), 1000BASE-T (Full Duplex), 10GBASE-T, 10GBASE-KR, 10GBASE-KX4, and 1000BASE-KX Ethernet networks, but the principles can be extended to all Ethernet networks.

During LPI, power consumption is reduced by turning off unused circuits. Consequently, transmit and receive data paths are turned off, parameters such as adaptive coefficients of filters and equalizers are stored, timing circuits are allowed to run free, and a refresh process is employed to periodically refresh timing and update parameters to ensure that that the circuitry might return to an active state with a relatively short initialization process. Using an OSI model, the MAC layer requests the PHY layer to enter or exit LPI. As proposed, the PHY sends Sleep Symbols for a fixed duration ("a sleep time"), upon which the PHY layer goes into a Quiet duration, which is a period of low power consumption. Periodically, the PHY layer temporarily "wakes-up" and enters Refresh duration, during which the PHY layer transmits Refresh Symbols for timing recovery and parameter synchronization. Upon request by the MAC layer, or if activated by received data, the PHY layer enters a Wake duration, during which time transmit and receive paths are activated, but no data is transmitted or received in order to give the system time to wake-up and transition fully to an active state.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention allows for fast turn-on/turn-off for a communication device, such as an Energy Efficient Ethernet device. Control logic provides a control signal to selectively enable or disable circuitry of the communication device. A bidirectional device includes a storage element and a switch responsive to the control signal, the bidirectional device coupled to the control logic and a node of the circuitry the communication device. Based on the control signal, the switch of the bidirectional device either i) stores charge from the node to the energy storage element during a first duration, or ii) provides charge from the energy storage element to the node during a second duration, the first duration greater than the second duration.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Embodiments of the present invention provide for improvements in turn-on time for active portions, such as analog circuits, of Energy Efficient Ethernet (EEE) devices by storing energy through a bidirectional device from a certain node in the device during an active state, continuing to store the energy when the device enters a Low Power Idle (LPI) state, and then allowing the energy to return to the node through the bidirectional device when the device returns to an active state. In preferred embodiments, analog voltage at the node is stored in a corresponding capacitor bank. During active mode, the bidirectional device controls the capacitor bank so as to charge relatively slowly to store energy, and when the device transitions to LPI, the charge is maintained in the capacitor bank. When the device returns to the active state through Ethernet data activity, the bidirectional device allows the capacitor bank to discharge relatively rapidly to the node, thereby improving the turn-on time of the circuit elements coupled to the node. The action of the bidirectional device might be controlled by a state machine.

Figure 1:
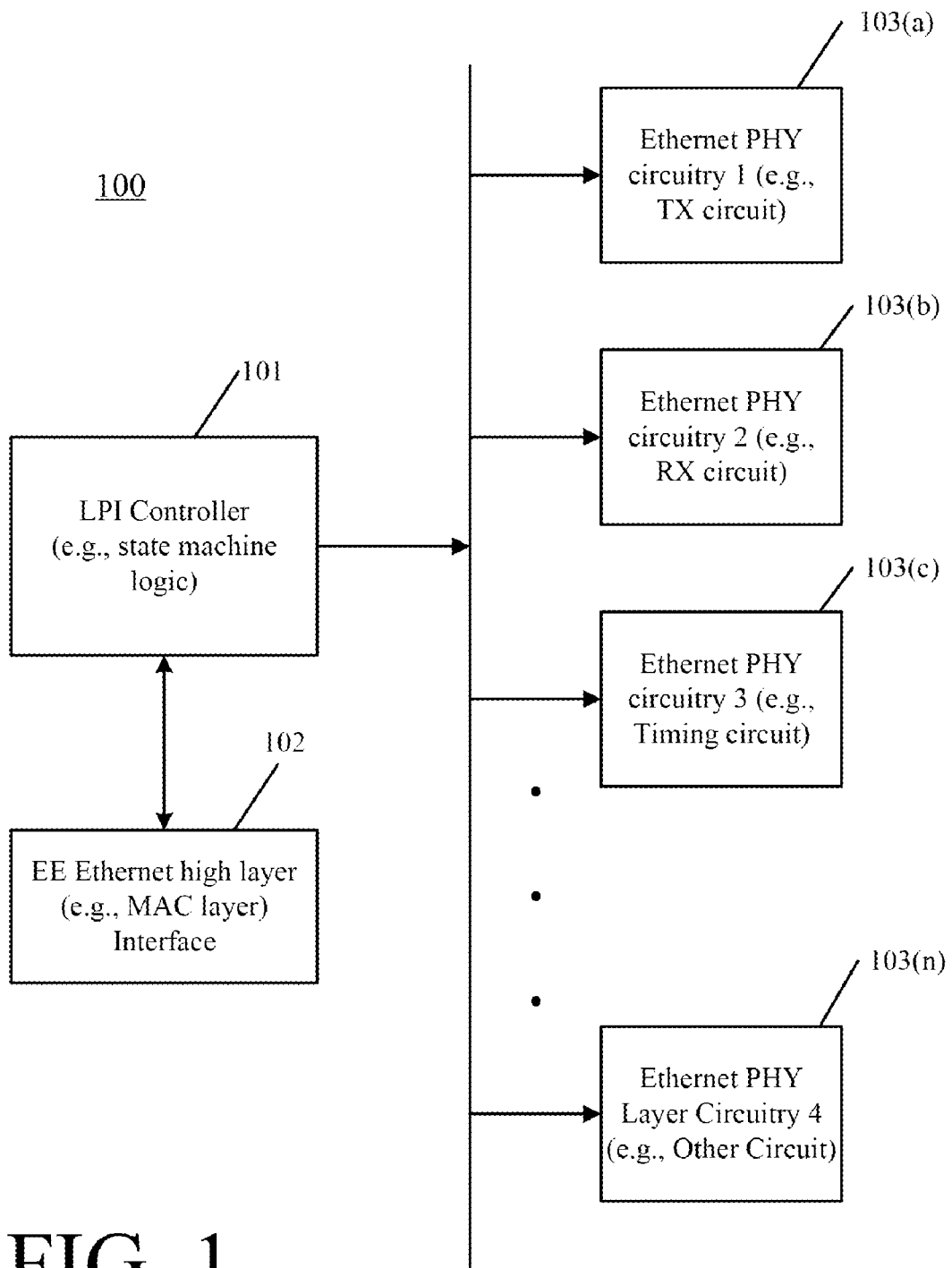
FIG. 1 shows an exemplary block diagram of a fast turn-on system (FTOS) for EEE devices.

FIG. 1 shows an exemplary block diagram of a fast turn-on system (FTOS) 100 for EEE devices. FTOS 100 includes LPI controller 101, which might be implemented with state machine logic or with a form of processor. LPI controller 102 is coupled to EE Ethernet high layer Interface 102. EE Ethernet high layer interface 102 receives commands, including EEE commands, for implementation at the Physical layer (or "PHY", such as described in the well known OSI model). Commands that might be received by EE Ethernet high layer interface 102 from the MAC layer correspond to powering up circuitry in an active state or powering down circuitry in the LPI state. EE Ethernet high layer Interface 102 translates these commands into a format (e.g., state machine input) for LPI controller 101.

LPI controller 101 is coupled to Ethernet PHY circuitry 103(a) through 103(n). Each of Ethernet PHY circuitry 103(a) through 103(n) represents a portion of Ethernet circuitry at the PHY layer of, for example, an Ethernet transceiver. For example, Ethernet PHY circuitry 103(a) might represent driver circuitry of a transmit (TX) circuit module, Ethernet PHY circuitry 103(b) might represent driver circuitry of a receive (RX) circuit module, and Ethernet PHY circuitry 103(c) might represent circuitry of a timing and synchronization circuit module. LPI controller 101 selectively applies signals to one or more of Ethernet PHY circuitry 103(a) through 103(n) to transition such circuitry between active and LPI states.

Figure 2:
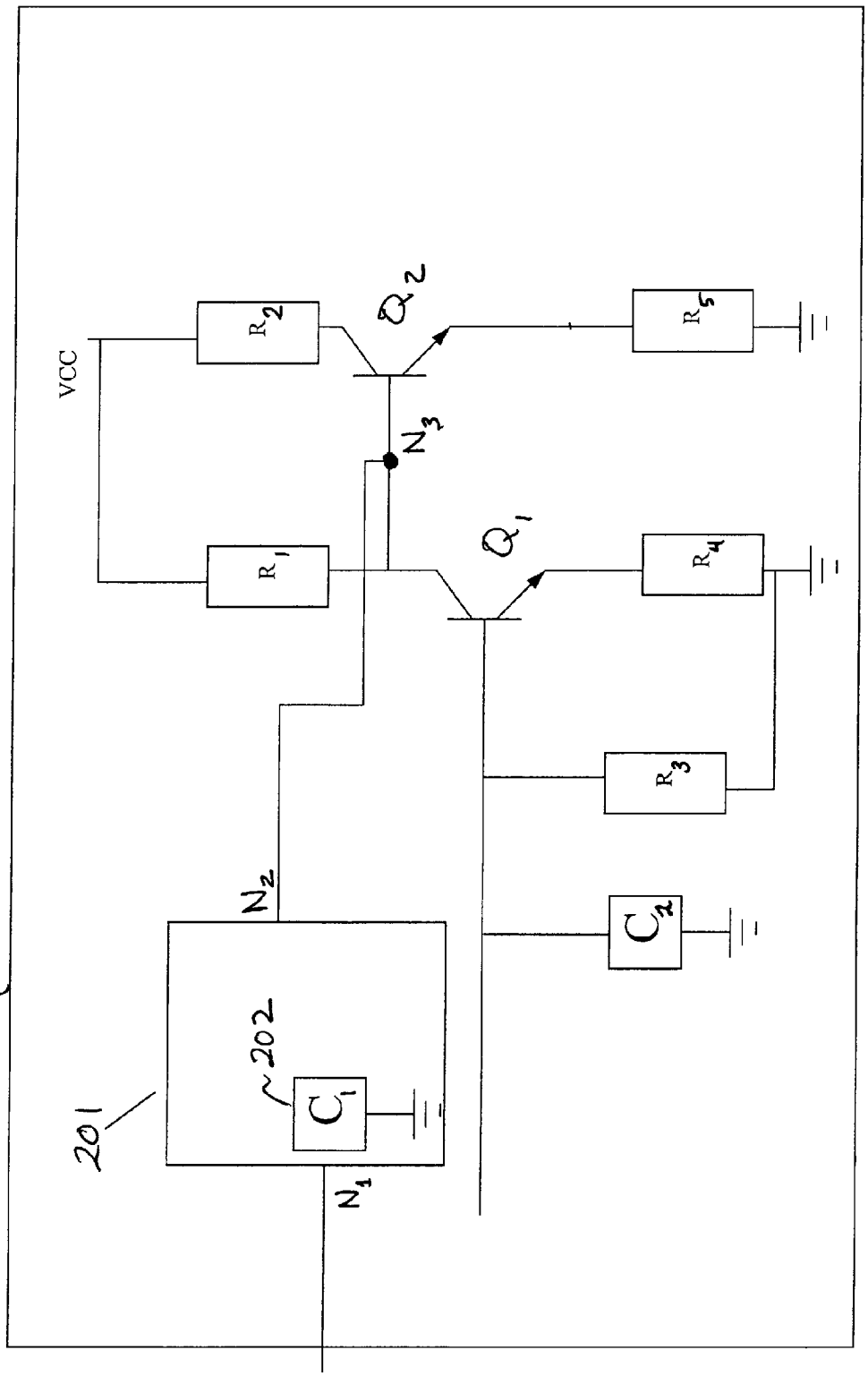
FIG. 2 shows an exemplary, simplified circuit schematic for Ethernet PHY circuitry of FIG. 1 incorporating a bidirectional device operating in accordance with embodiments of the present invention.

FIG. 2 shows an exemplary, simplified circuit schematic for Ethernet PHY circuitry 103(a) of FIG. 1 incorporating bidirectional device 201 operating in accordance with embodiments of the present invention. In FIG. 2, resistors $R_1$, $R_2$, $R_3$, $R_4$, $R_5$; capacitor C2; and transistors Q1 and Q2 represent typical driver circuitry of a TX circuit biased from supply voltage VCC.

Bidirectional device 201 receives a logic state signal from LPI controller 101 to either store or provide energy through node $N_2$ to one or more certain nodes in the device, such as shown in FIG. 2 at node $N_3$. Bidirectional device 201 stores energy from the one or more certain nodes in the device in energy storage element 202 during an active state, continuing to store the energy when the device enters a Low Power Idle (LPI) state, and then allowing the energy to return to the one or more certain nodes in the device from the bidirectional device when the device returns to an active state. While energy storage element 202 is shown in the FIGs. incorporated in bidirectional device 201, the present invention is not so limited and energy storage element 202 might be implemented separate from the bidirectional device.

For example, analog voltage at node $N_3$ is stored in corresponding energy storage element 202, which might be implemented as a capacitor bank having capacitance $C_1$. During active mode, bidirectional device 201 controls the capacitor bank so as to charge relatively slowly to store energy, and when the device transitions to LPI, the charge is maintained in the capacitor bank. When the device returns to the active state through Ethernet data activity, bidirectional device 201 allows the capacitor bank to discharge relatively rapidly to node $N_3$.

Figure 3:
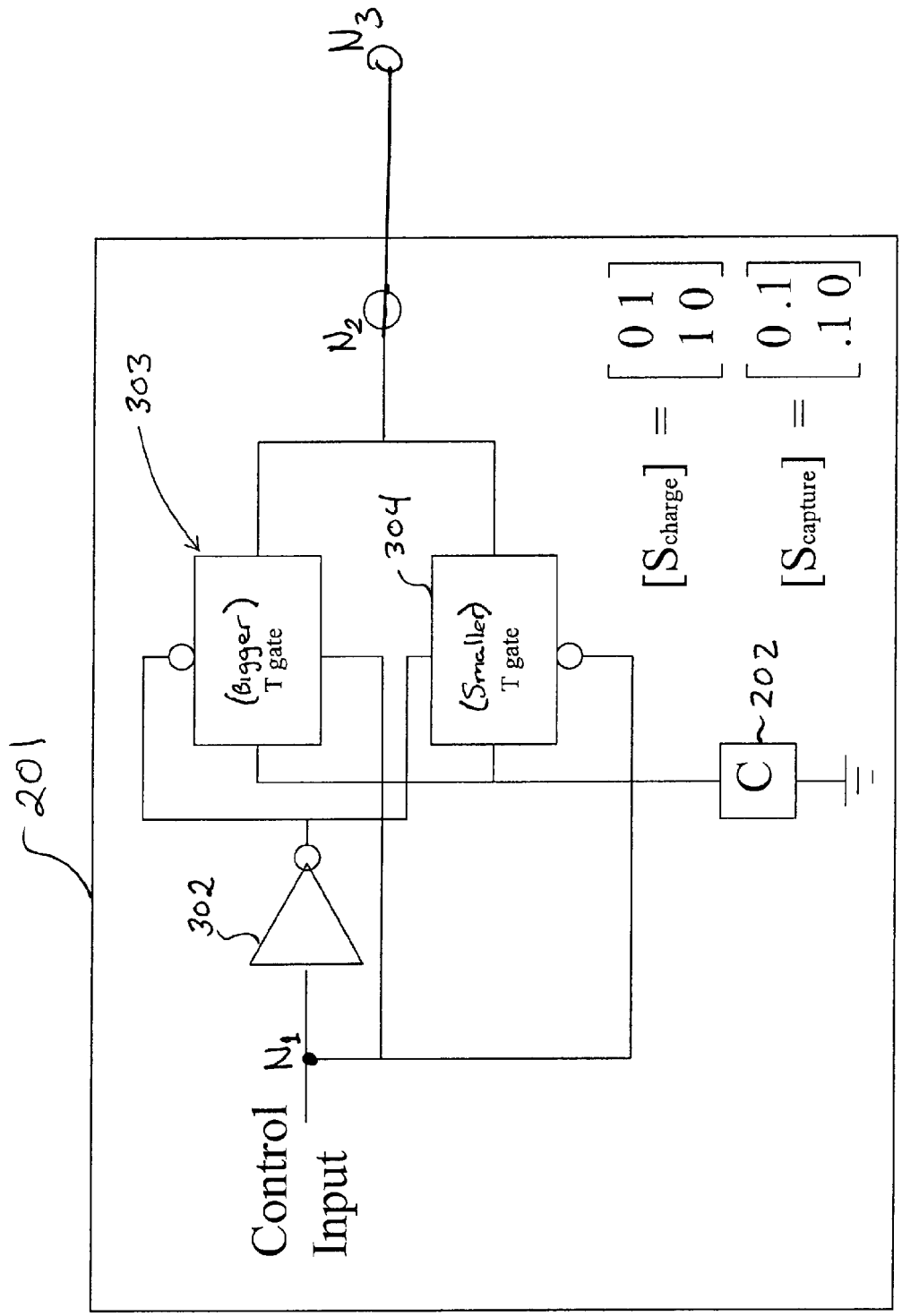
FIG. 3 shows an exemplary embodiment of bidirectional device 201 of FIG. 2.

FIG. 3 shows an exemplary embodiment of bidirectional device 201 of FIG. 2. Bidirectional device 201 receives a control input signal from LPI controller 101, which might be a logic "1" or logic "0", depending on design, where the logic value represents a command to either i) capture (e.g., with a logic "1" command) charge from an external node (e.g., node $N_3$) or ii) transfer (e.g., with a logic "0" command) charge to the external node. Bidirectional device 201 includes inverter 302 which provides an inverted version of the control input signal. The output node $N_2$ (and hence, e.g., $N_3$) is coupled to corresponding energy storage element 202 through transmission gates (T-gate) 303 and 304. T-gate 303 is implemented with transistors having relatively large gate width, and T-gate 304 is implemented with transistors having a relatively small gate width. T-gate 303 has its first (non-inverting) and second (inverting) gate voltage terminals coupled to the control input and inverted control input signals, respectively, and T-gate 304 has its first (non-inverting) and second (inverting) gate voltage terminals coupled to the inverted control input and control input signals, respectively.

Based on the control input signal, either T-gate 303 and T-gate 304 are enabled or disabled, corresponding to a low-impedance or a high impedance, respectively, between output node $N_2$ (and hence, e.g., $N_3$) and corresponding energy storage element 202. When enabled, T-gate 303 switches on (conducting) with a low impedance, allowing charge to flow from energy storage element 202 to output node $N_2$, while T-gate 304 is disabled (non-conducting). Similarly, when enabled, T-gate 304 switches on with a high impedance, allowing charge to flow to energy storage element 202 to output node $N_2$, while T-gate 303 is disabled. Therefore, T-Gate 303 and T-gate 304 combine to operate as a bidirectional switch.

A T-gate might be realized as a circuit including one N-type and one P-type transistor connected in parallel and controlled by inverted gate voltages. This combination of N-type and P-type transistors allows for efficient switching in CMOS technology. If the gate voltage of the N-type transistor is 'GND', the P-type transistor has a gate voltage of 'VCC' and both transistors are non-conducting. On the other hand, if the gate voltage of the N-type transistor is 'VCC' and the gate voltage of the P-type transistor is 'GND', both transistors are conducting. If the source voltage is near VCC, there is a voltage drop across the N-type transistor but (almost) no voltage drop across the P-type transistor. If the source voltage is near GND, the N-type transistor has (almost) no voltage drop. Because of the symmetry of standard MOS transistors, generally source and drain are not differentiated in a T-gate.

Returning to FIG. 3, the gate width of T-gates 303 and 304 is related to the impedance of the T-gate, and, therefore, the impedance seen between output node $N_2$ (and hence, e.g., $N_3$) and corresponding energy storage element 202. ON-impedance of a MOS is, with constant gate length, inversely proportional to gate width; therefore, wider gate width, in general, translates to lesser impedance. While described embodiments relate T-gates 303 and 304 by the relative width of their respective gates, other embodiments of the present invention might, instead, vary gate length of the MOS device to obtain the same relative difference in impedance between T-gate devices.

Shown in FIG. 3 are scattering parameters $[S_{charge}]$ and $[S_{capture}]$ of T-gates 303 and 304 for the control input values corresponding to charging (providing charge from energy storage element 202 to output node $N_2$) the node $N_3$ when the EEE device transitions to the active state and capturing (receiving charge in energy storage element 202 from node N2) energy from the node $N_3$ when the EEE device transitions to, and during, the LPI state. Consequently, during a period (e.g., defined by $[S_{capture}]$) when the T-gate 303 appears as a high impedance (i.e., off) and T-gate 304 is at a low impedance (i.e., on), charge only slowly passes from the external node N3 to energy storage element 202 due to the long time constant of the capacitive device, and the high impedance does not affect or otherwise the load the circuits of, for example, the TX circuitry of Ethernet PHY circuitry 103(a). Conversely, during the period (e.g., defined by $[S_{charge}]$) when the T-gates 303 appears as a low impedance (i.e., on) and T-gate 304 appears as a high impedance (i.e., off), charge passes relatively quickly from energy storage element 202 to the external node $N_3$, due to the short time constant of the capacitive device, thereby charging the circuits of, for example, the TX circuitry of Ethernet PHY circuitry 103(a) relatively quickly for a fast turn on.

Although not shown in FIG. 3, an additional embodiment of the present invention might include a mode of the bidirectional device switch that includes a power-down state such that, when in the power down state, both T gates are "off" and in their open, high impedance condition. This power-down state isolates the charge stored on the internal energy storage element from other circuitry so that it is better maintained until needed during the power up state.

Figure 4:
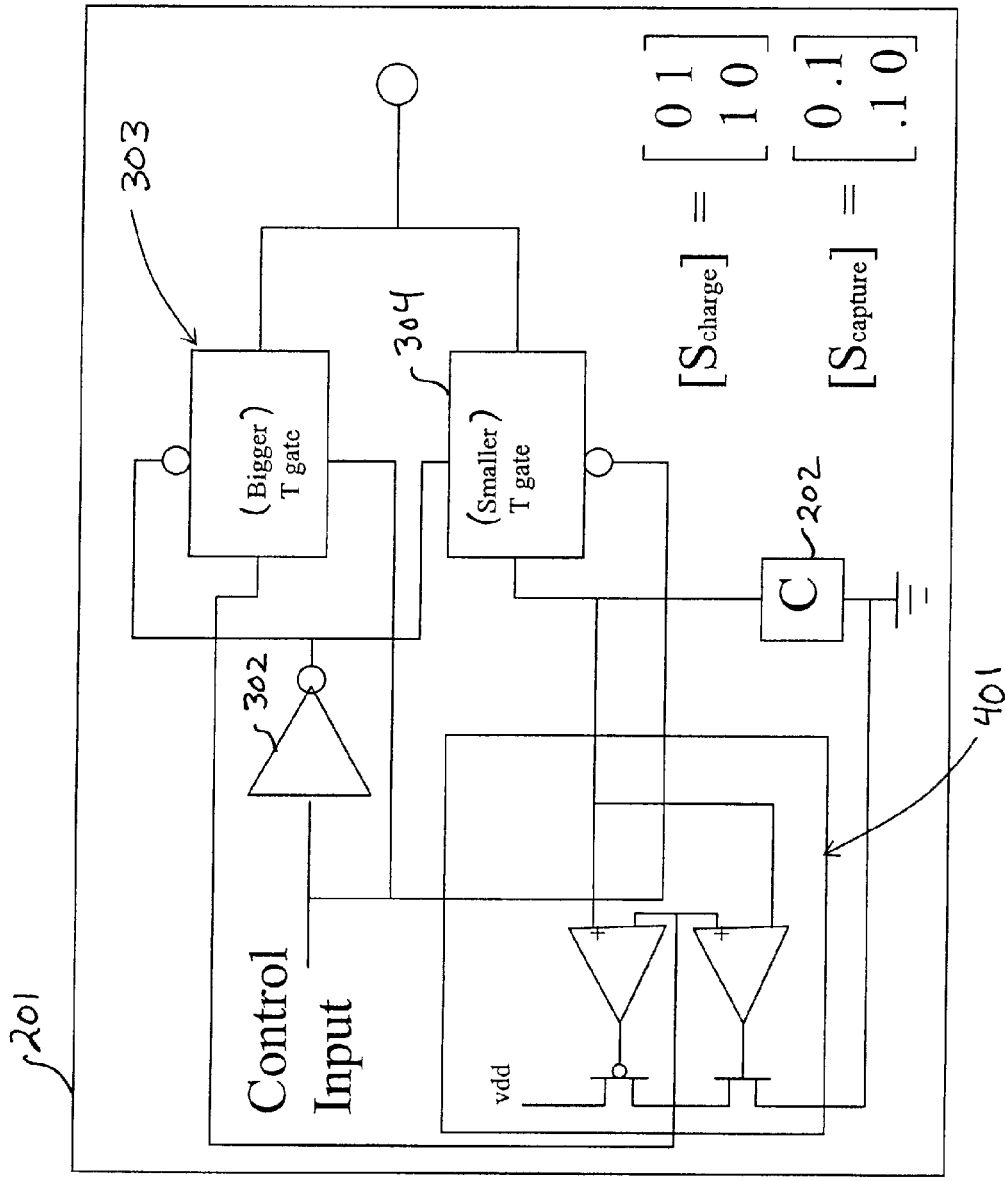
FIG. 4 shows an alternative exemplary embodiment of bidirectional device 201 of FIG. 2.

FIG. 4 shows an alternative exemplary embodiment of bidirectional device 201 of FIG. 2, where like-numbered elements in FIGS. 3 and 4 are defined and operate in a similar manner. FIG. 4 shows source amplifier 401 as an additional circuit coupled between the low potential terminal of energy storage element 202 and one (i.e., driven) terminal of T-gate 303. Source amplifier 401, shown as a class AB amplifier configuration with a dead zone, consumes power and drives its output terminal only when driving enabled T-gate 303, thereby charging node $N_2$. Since the energy delivered to node $N_2$ (and thus, $N_3$) is now delivered from a separately switched energy source (source amplifier 401) under control of the energy storage device 202, the size (e.g., capacitance value) of the energy storage device is no longer proportional to the amount of energy that it must deliver to the external node, allowing for an implementation with a much smaller capacitive device value. Smaller capacitance, in turn, prevents loading of external circuits, and allows for a faster charge transfer (lower RC time constant) to the external node.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Also, for purposes of this description, it is understood that all gates are powered from a fixed-voltage power domain (or domains) and ground unless shown otherwise. Accordingly, all digital signals generally have voltages that range from approximately ground potential to that of one of the power domains and transition (slew) quickly. However and unless stated otherwise, ground may be considered a power source having a voltage of approximately zero volts, and a power source having any desired voltage may be substituted for ground. Therefore, all gates may be powered by at least two power sources, with the attendant digital signals therefrom having voltages that range between the approximate voltages of the power sources.

Signals and corresponding nodes or ports may be referred to by the same name and are interchangeable for purposes here. Transistors are typically shown as single devices for illustrative purposes. However, it is understood by those with skill in the art that transistors will have various sizes (e.g., gate width and length) and characteristics (e.g., threshold voltage, gain, etc.) and may consist of multiple transistors coupled in parallel to get desired electrical characteristics from the combination. Further, the illustrated transistors may be composite transistors.

It will be further understood that various changes in the details, materials, and arrangements of the parts which have been described and illustrated in order to explain the nature of this invention may be made by those skilled in the art without departing from the scope of the invention as expressed in the following claims.

I claim:

1. Apparatus for fast turn-on/turn-off for a communication device, the apparatus comprising:
    control logic adapted to provide a control signal to selectively enable or disable circuitry of the communication device; and
    a bidirectional device having an energy storage element and a switch responsive to the control signal, the bidirectional device coupled to the control logic and a node of the circuitry of the communication device, wherein the energy storage element further comprises at least one capacitor and a source amplifier coupled to the at least one capacitor and the bidirectional device, wherein the source amplifier provides charge from the energy storage element to the node during a second duration based on a capacitance and stored charge of the at least one capacitor,
    wherein, based on the control signal, the switch of the bidirectional device either i) stores charge from the node to the energy storage element during a first duration, or ii) provides charge from the energy storage element to the node during a second duration, the first duration greater than the second duration.

2. The apparatus invention of claim 1, wherein the first duration and the second duration are based on an impedance of the switch seen at the node, the first duration corresponding to a first impedance value and the second duration corresponding to a second impedance value, the first impedance value greater than the second impedance value.

3. The apparatus of claim 1, wherein the switch comprises a first T-gate and a second T-gate, the first T-gate and the second T-gate coupled to the control logic to receive the control signal and coupled in parallel between the energy storage element and the node, wherein the first T-gate provides an impedance time-constant for the first duration, and the second T-gate provides an impedance time-constant for the second duration.

4. The apparatus of claim 3, wherein the first T-gate impedance time-constant is based on at least one of a gate width and a gate length of transistors of the first T-gate, and the second T-gate impedance time-constant is based on at least one of a gate width and a gate length of transistors of the second T-gate.

5. The apparatus of claim 3, wherein during a capture state the first T-gate is on and the second T-gate is off, and during a charge state the first T-gate is off and the second T-gate is on.

6. The apparatus of claim 3, further comprising a power-down state, wherein during the power-down state the first T-gate and the second T-gate are off.

7. The apparatus of claim 1, wherein the communication device is an Energy Efficient Ethernet device.

8. The apparatus of claim 7, wherein the control logic is further configured to i) receive a MAC layer command to transition between an active state and a Low Power Idle state and ii) provide the control signal based on the MAC layer command to one or more Ethernet PHY Layer circuitry.

9. The apparatus of claim 8, wherein the one or more Ethernet PHY Layer circuitry is at least one of a transmit circuit, a receive circuit, and a timing circuit.

10. A method of fast turn-on/turn-off for a communication device, the method comprising the steps of:
    providing, by control logic, a control signal to selectively enable or disable circuitry of the communication device, the circuitry including at least one node, wherein the communication device is an Energy Efficient Ethernet device;
    receiving, by the control logic, a MAC layer command to transition between an active state and a Low Power Idle state;
    providing, by the control logic, the control signal based on the MAC layer command to one or more Ethernet PHY Layer circuitry; and
    based on the control signal, by the one or more Ethernet PHY Layer circuitry, either:
    i) storing, by a switch of a bidirectional device responsive to the control signal, charge from a node to an energy storage element during a first duration, or
    ii) providing, by the switch of the bidirectional device responsive to the control signal, charge from the energy storage element to the node during a second duration, the first duration greater than the second duration.

11. The method of claim 10, wherein, for the storing and providing steps, the first duration and the second duration are based on an impedance of the switch seen at the node, the first duration corresponding to a first impedance value and the second duration corresponding to a second impedance value, the first impedance value greater than the second impedance value.

12. The method of claim 10, wherein, for the storing and providing steps, the switch comprises a first T-gate and a second T-gate, the first T-gate and the second T-gate coupled in parallel between the energy storage element and the node, wherein the first T-gate provides an impedance time-constant for the first duration, and the second T-gate provides an impedance time-constant for the second duration.

13. The method of claim 12, wherein the first T-gate impedance time-constant is based on at least one of a gate width and a gate length of transistors of the first T-gate, and the second T-gate impedance time-constant is based on at least one of a gate width and a gate length of transistors of the second T-gate.

14. The method of claim 12, comprising during a capture state turning on the first T-gate and turning off the second T-gate, and during a charge state turning off the first T-gate is off and turning on the second T-gate.

15. The method of claim 10, wherein the one or more Ethernet PHY Layer circuitry is at least one of a transmit circuit, a receive circuit, and a timing circuit.

16. An integrated circuit (IC) having an apparatus for fast turn-on/turn-off for a communication device, the IC comprising:
    control logic configured to (i) provide a control signal to selectively enable or disable circuitry of the communication device, wherein the communication device is an Energy Efficient Ethernet device, (ii) receive a MAC layer command to transition between an active state and a Low Power Idle state, and (iii) provide the control signal based on the MAC layer command to one or more Ethernet PHY Layer circuitry; and
    a bidirectional device having an energy storage element and a switch responsive to the control signal, the bidirectional device coupled to the control logic and a node of the circuitry of the communication device, wherein the energy storage element further comprises at least one capacitor and a source amplifier coupled to the at least one capacitor and the bidirectional device, wherein the source amplifier provides charge from the energy storage element to the node during a second duration based on a capacitance and stored charge of the at least one capacitor, wherein, based on the control signal, the switch of the bidirectional device either i) stores charge from the node to the energy storage element during a first duration, or ii) provides charge from the energy storage element to the node during a second duration, the first duration greater than the second duration.

* * * * *